(12) United States Patent
Taylor et al.

(10) Patent No.: US 6,556,249 B1
(45) Date of Patent: Apr. 29, 2003

(54) JITTER CANCELLATION TECHNIQUE FOR VIDEO CLOCK RECOVERY CIRCUITRY

(75) Inventors: Gerard E. Taylor, Cupertino, CA (US); Curtis Robinson, Sunnyvale, CA (US); David W. Ritter, San Jose, CA (US); Robert Zucker, Los Altos, CA (US)

(73) Assignee: Fairchild Semiconductors, Inc., South Portland, ME (US)

( * ) Notice: Subject to any disclaimer, the term of this patent is extended or adjusted under 35 U.S.C. 154(b) by 0 days.

(21) Appl. No.: 09/390,733

(22) Filed: Sep. 7, 1999

(51) Int. Cl.$^7$ .............................. H04N 7/04; H04N 7/00; H04N 11/04; H04N 5/08; H04N 5/21; H04N 5/213; H04N 5/217; H04L 25/00; H04L 25/40; H04L 3/24

(52) U.S. Cl. ..................... 348/497; 348/512; 348/537; 348/533; 348/470; 348/607; 375/371; 375/373

(58) Field of Search ......................... 348/512, 497, 348/508, 536, 537, 607, 470, 533; 375/371–376, 356; 370/516–518; 327/149, 152, 153, 158, 161; 702/69

(56) References Cited

U.S. PATENT DOCUMENTS

| | | | | |
|---|---|---|---|---|
| 4,718,074 A | * | 1/1988 | Mannas et al. | 375/118 |
| 4,987,491 A | * | 1/1991 | Kaite et al. | 348/497 |
| 5,132,554 A | * | 7/1992 | Hiramatsu et al. | 307/269 |
| 5,223,931 A | | 6/1993 | Fernsler et al. | 358/158 |
| 5,280,345 A | * | 1/1994 | Uehara et al. | 348/498 |
| 5,303,061 A | * | 4/1994 | Matsumoto et al. | 348/500 |
| 5,307,381 A | * | 4/1994 | Ahuja | 375/107 |
| 5,359,366 A | * | 10/1994 | Ubukata et al. | 348/536 |
| 5,497,200 A | * | 3/1996 | Otaki et al. | 348/497 |
| 5,557,335 A | * | 9/1996 | Oh | 348/512 |
| 5,619,276 A | | 4/1997 | Christopher et al. | 348/541 |
| 5,796,796 A | * | 8/1998 | Wang | 375/372 |
| 5,877,640 A | * | 3/1999 | Geerlings | 327/141 |
| 5,999,226 A | * | 12/1999 | Choi | 348/564 |
| 6,229,861 B1 | * | 5/2001 | Young | 375/356 |
| 6,256,003 B1 | * | 7/2001 | Tsuchiya et al. | 345/87 |
| 6,363,129 B1 | * | 3/2002 | Agazzi | 375/355 |

* cited by examiner

Primary Examiner—John Miller
Assistant Examiner—Paulos Natnael
(74) Attorney, Agent, or Firm—Haverstock & Owens LLP

(57) ABSTRACT

A method and apparatus for compensating for time base or phase errors in video and audio signals that are separately stored or processed. A ring oscillator provides a plurality of clock signals, each having a same frequency and slightly different phase. Each of the clock signals is applied to a multiplexor for allowing an appropriate one of the clock signals to be selected. By selecting appropriate ones of the clock signals in a sequence, the frequency and phase of an output clock signal formed by the multiplexor can be continuously and precisely controlled. Sync pulses separated from a video signal having a varying time base are applied to a video timing generator circuit which generates a series of digital values representative of timing differences between an expected occurrence of a sync pulse and an actual occurrence of the sync pulse. A phase accumulator accumulates the digital values over time for generating appropriate addresses for the multiplexor. Therefore, the frequency and phase of the output clock signal is controlled according to the phase of the sync pulses. Additional logic circuits coupled to the video timing generator generate a series of digital values representing a sinusoid having a stable time base, but which is clocked according to the output clock signal. This sinusoid can be utilized to demodulate a chrominance component signal stored according to the "color under" format. The output clock signal can be utilized for separately processing video and associated audio signals while maintaining time base relationships among the signals.

16 Claims, 6 Drawing Sheets

JITTER CANCELLATION TECHNIQUE FOR VIDEO CLOCK RECOVERY CIRCUITRY

FIELD OF THE INVENTION

The invention relates to the field of recovering video and audio signals that are processed or stored separately. More particularly, the invention relates to the field of compensating for variations in time bases of audio and video signals that are processed or stored separately and synchronizing the signals for playback.

BACKGROUND OF THE INVENTION

In broadcast television systems, video and audio, signals are broadcast in a composite format which includes all of the information needed to display a picture. NTSC and PAL are two widely utilized broadcast composite video standards. A composite video signal generally includes a luminance component signal and a chrominance component signal. Synchronizing pulses included in the luminance component signal synchronize the television receiver to the luminance signal. To form the composite video signal, the chrominance component signal is modulated by a high frequency subcarrier and is superimposed over the luminance component signal. A "color burst", which is a series of eight cycles at the subcarrier frequency, appears in blanking intervals for synchronizing the television receiver to the chrominance component signal.

For broadcasting, the composite video signal is modulated by a visual carrier signal within the assigned broadcast channel and an audio signal is modulated by an aural carrier signal within the assigned broadcast channel. When a television receives the broadcast signal via a cable or antenna, the carrier signals are removed by mixing. Then, the luminance and chrominance component signals are separated from the composite signal. The luminance and chrominance component signals are then transformed into red, green and blue component signals for driving an electron gun in the television display.

When video signals are stored on a magnetic tape, such as by a video cassette recorder, the signals are not stored in a composite video format, but are stored in a format known as "color under." In "color under" format, the chrominance and luminance component signals are processed separately. The chrominance component is heterodyned down to occupy a frequency range below the luminance component, rather than being interleaved, as in the composite video format. The luminance and chrominance component signals are then stored on the magnetic tape in tracks which are angled with respect to the length of the magnetic tape. The audio signal is frequency modulated and combined with the video tracks or is recorded on a separate longitudinal track.

Upon playback, the chrominance component is modulated back up to an appropriate frequency (3.579545 MHz in NTSC systems), reversing the "color under" process. The chrominance signal is also stabilized to correct for any time base errors caused by dimension changes in the magnetic tape or inaccuracies in the tape player mechanism. The time base errors are reduced by an analog process which utilizes a crystal controlled phase-locked loop synchronized to the color bursts. A tight time base tolerance is required by circuits in the television to be able lock onto the chrominance component signal. The luminance component signal, however, is passed directly to the television. Because the chrominance component signal has a time base that is precisely controlled and the luminance component signal does not, the component signals are no longer synchronized to each other. This results in "jitter" during playback which inherently degrades the picture quality.

Therefore, what is needed is a technique for compensating for time base or phase errors in video component signals for enhancing the picture quality obtainable from a video cassette player.

Further, a trend in contemporary video and computer systems is to perform a variety of digital signal processing techniques on video signals and their associated audio signals. Because each video and audio signal has its own set of characteristics, a signal processing technique utilized for one signal is not generally applicable to another signal. Therefore, the signals are often separated from each other for digital, sampling, storage and/or processing. For example, data compression techniques adapted to compress video signals are not generally suitable for compressing audio signals, whereas, data compression techniques adapted to compress audio signals are not generally suitable for compressing video signals. Further, certain processes performed on video signals for enhancing color or crispness cannot generally be applied to audio signals.

Processing of signals separately can cause problems, however, due to variations in the time base for each signal. For example, a clock signal utilized to control digital processing of a video signal stored on a magnetic tape can be locked to the sync pulses or to the color bursts in the stored video signal. Due to a varying relationship between the phase of the color bursts and the phase of the sync pulses, however, a luminance component processed according to a clock signal locked to the color bursts can suffer from +/−1 pixel timing uncertainty. This can result in picture hopping and breakup. As another example, a chrominance component processed according to a clock signal locked to the sync pulses can suffer from jitter and poor signal-to-noise ratios.

In addition, precise timing relationships can be lost or degraded when compressing and decompressing digital audio signals. When decompressed audio signals are combined with video signals, timing variations can cause a disturbing lack of synchronism between audio and visual elements. For example, spoken words may not match movement of the speaker's lips. Further, relatively small timing errors can cumulate over the course of a program to unacceptable levels. Accordingly, unless audio signals are properly synchronized to the associated video signals, problems can occur when recombining the signals for playback.

Therefore, what is needed is a technique for compensating for time base or phase variations in video signals and in audio signals that are separately stored or processed such that the signals can be appropriately synchronized for playback.

SUMMARY OF THE INVENTION

The invention is a method and apparatus for compensating for time base or phase errors in video and audio signals that are separately stored or processed such that the signals can be appropriately synchronized for playback. A ring oscillator locked to a crystal oscillator provides a plurality of clock signals, each having a same frequency and a slightly different phase. Each of the clock signals is applied to a multiplexor logic circuit for allowing an appropriate one of the clock signals to be selected at any given moment. By selecting appropriate ones of the clock signals in a sequence, the frequency and phase of an output clock signal appearing at the output of the multiplexor can be continuously and precisely controlled without disturbing the crystal oscillator.

Sync pulses are separated from a video signal that can have a varying time base. The sync pulses are applied to a video timing generator circuit which generates a series of digital values wherein each digital value is representative of a timing difference between an expected occurrence of a sync pulse and an actual occurrence of the sync pulse. A phase accumulator logic circuit accumulates the digital values over time for generating appropriate address signals for the multiplexer. This allows the frequency and phase of the output clock signal to be continuously and precisely controlled according to the phase of the sync pulses.

Additional logic circuits coupled to the video timing generator circuit generate a series of digital values representing a periodic signal, such as a sinusoid, having a stable time base, but which is clocked according to the clock signal appearing at the output of the multiplexor. This periodic signal can be utilized to demodulate a chrominance component signal stored according to the "color under" format such that the chrominance component signal is synchronized to an associated luminance component signal during playback by a video cassette player. The clock signal appearing at the output of the multiplexor can be utilized for separately processing video signals and associated audio signals, while maintaining time base relationships among the signals.

DETAILED DESCRIPTION OF THE PREFERRED EMBODIMENTS

Figure 1:
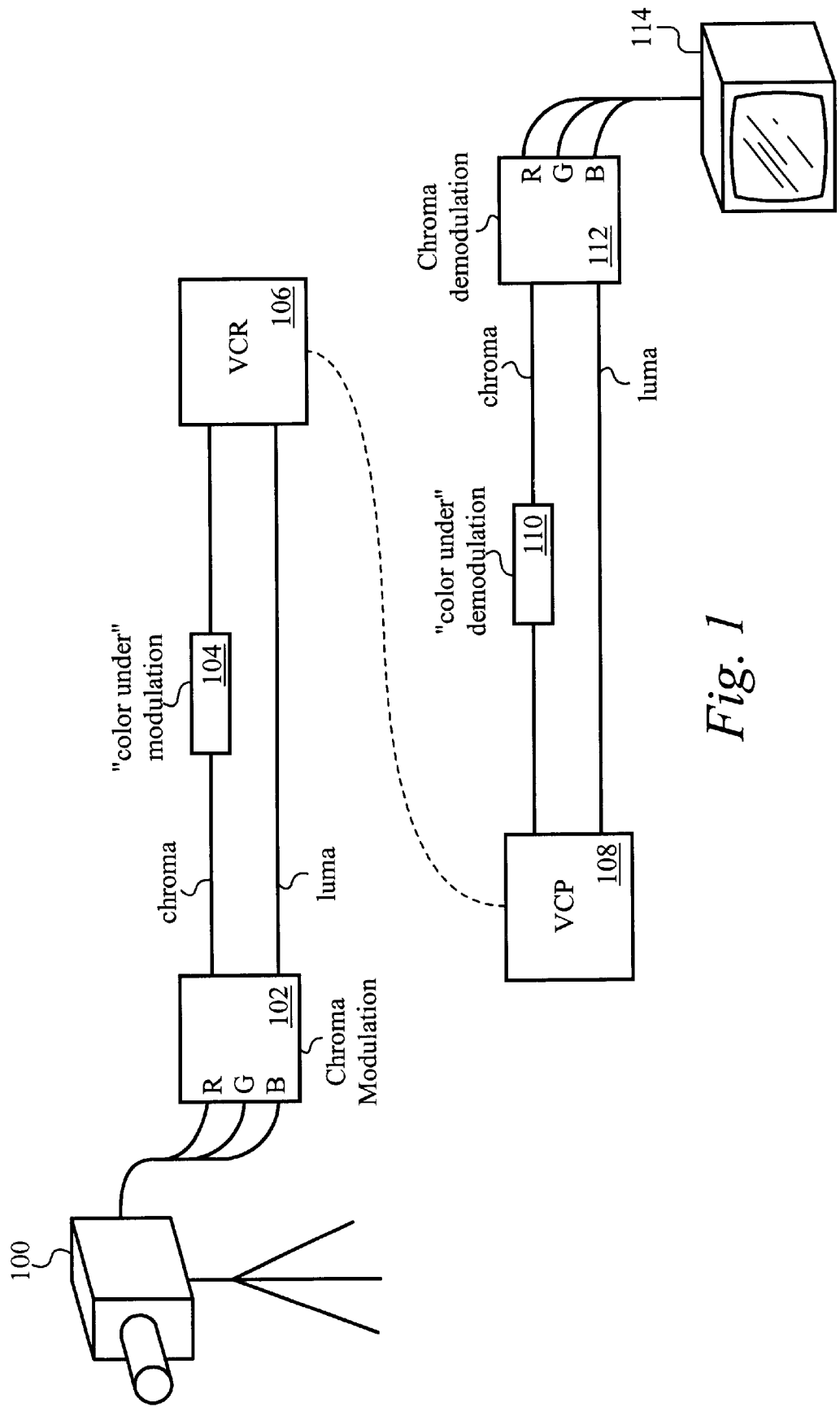
FIG. 1 illustrates a block schematic diagram of a video recording and playback system according to the present invention.

FIG. 1 illustrates a block schematic diagram of a video recording and playback system according to the present invention. A video camera 100 provides red, green and blue component signals to a chroma modulation block 102. The chroma modulation block 102 converts the red, green and blue component signals into chroma and luma composite signals. The luma signal is provided directly to a video cassette recorder 106 while the chroma signal is heterodyned down by a "color under" modulation block 104 before being supplied to the video cassette recorder. The video cassette recorder 106 then stores the chroma and luma signals on a magnetic video tape according to conventional techniques.

For playback, the video tape is read by a video cassette player 108. A luma signal is provided directly to a chroma demodulation block 112 while a "color under" demodulation block 110 reverses the "color under" modulation preformed by the block 104 before providing a chroma signal to the chroma demodulation block 112. The chroma demodulation block 112 converts the chroma and luma signals provided at its inputs into red, green and blue component signals. The red, green and blue component signals are then provided to a video monitor 114 which displays an image representative of an image viewed by the video camera 100. In comparison to conventional video playback techniques, the present invention improves the quality of the image displayed on the video monitor 114 by correcting for phase and time base errors in the signals obtained from the video cassette player 108 and provided to the video monitor 114. After reading the disclosure contained herein, it will become apparent that the system illustrated in FIG. 1 is illustrative only and that the present invention, as described in the appended claims, can be utilized to advantage in other signal processing systems.

Figure 2:
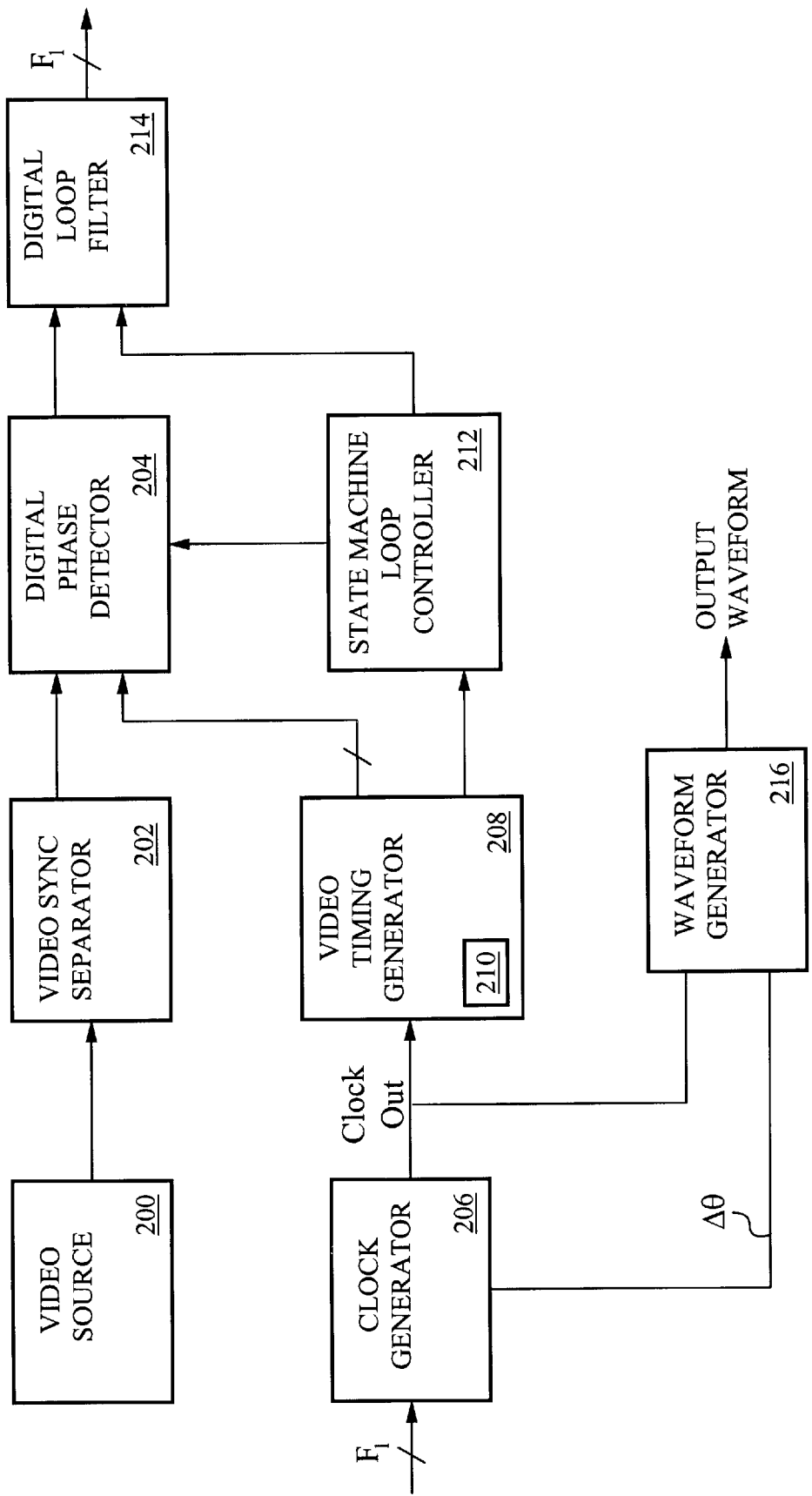
FIG. 2 illustrates a block schematic diagram of a jitter cancellation circuit according to the present invention for generating a series of digital values each of which represents a time base or phase error associated with a portion of a video signal and for generating a periodic waveform clocked according to a clock signal.

FIG. 2 illustrates a block schematic diagram of a jitter cancellation circuit according to the present invention for generating a series of digital values $F_1$ each of which represents a time base or phase error associated with a portion of a video signal and for generating a periodic waveform OUTPUT WAVEFORM clocked according to a clock signal CLOCK OUT. A video source 200, such as the video cassette player 108 (FIG. 1), provides a video signal to a video sync separator circuit 202. The video signal has an expected time base which is related to an average frequency of sync pulses contained in the video signal. Due to changes in the dimensions of a magnetic tape or other factors, however, the video signal has a continuously varying time base such that the temporal separation of sync pulses continuously varies. The video sync separator circuit 202 separates horizontal sync pulses from the video signal and provides the sync pulses to a digital phase detector 204.

A clock generator 206 (described in more detail herein with reference to FIG. 3) generates a clock signal CLOCK OUT which is provided to a video timing generator 208. The video timing generator 208 includes a digital counter 210 which decrements with each clock pulse received from the clock generator 206. The counter 210 is reset by each sync pulse, and upon being reset, the counter 210 starts again at a maximum count. The maximum count is representative of an average number of clock pulses expected to occur between sync pulses in the video signal. When the digital phase detector 204 receives a next sync pulse from the video sync separator 202, the digital phase detector 204 latches the current count from the video timing generator 208. Because the count is expected to reach zero when the separation between sync pulses is constant, the actual count latched by the digital phase detector 204 represents a timing error associated with the sync pulse. This process is repeated for each sync pulse, thus generating a series of digital values $F_1$, each of which represents the time base or phase error associated with a portion of the video signal corresponding to the sync pulse. The series of digital values $F_1$ are utilized by the clock generator 206 for forming the clock signal CLOCK OUT. Thus, the circuit illustrated in FIG. 2 includes a feedback loop through the clock generator 206, the video timing generator 208, the digital phase detector 204, and the digital loop filter 214 for generating the digital values $F_1$.

The digital loop filter 214 filters the digital values $F_1$ before they are provided to the clock generator 206 for maintaining stability in the system. Thus, the digital loop filter 214 ensures that adjustments to the clock signal CLOCK OUT are not attempted to be made at rate which exceeds the stability requirements of the feedback loop.

The state machine controller 212 appropriately controls the digital phase detector 204 and digital loop filter 214. For example, the state machine controller 212 ensures that the digital phase detector 204 is synchronized to the video timing generator 208 and to the sync signals from the video source 200 for start-up and during normal operation. In addition, the state machine controller 212 appropriately adjusts the bandwidth for the digital loop filter 214 for start-up and during normal operation.

Figure 3:
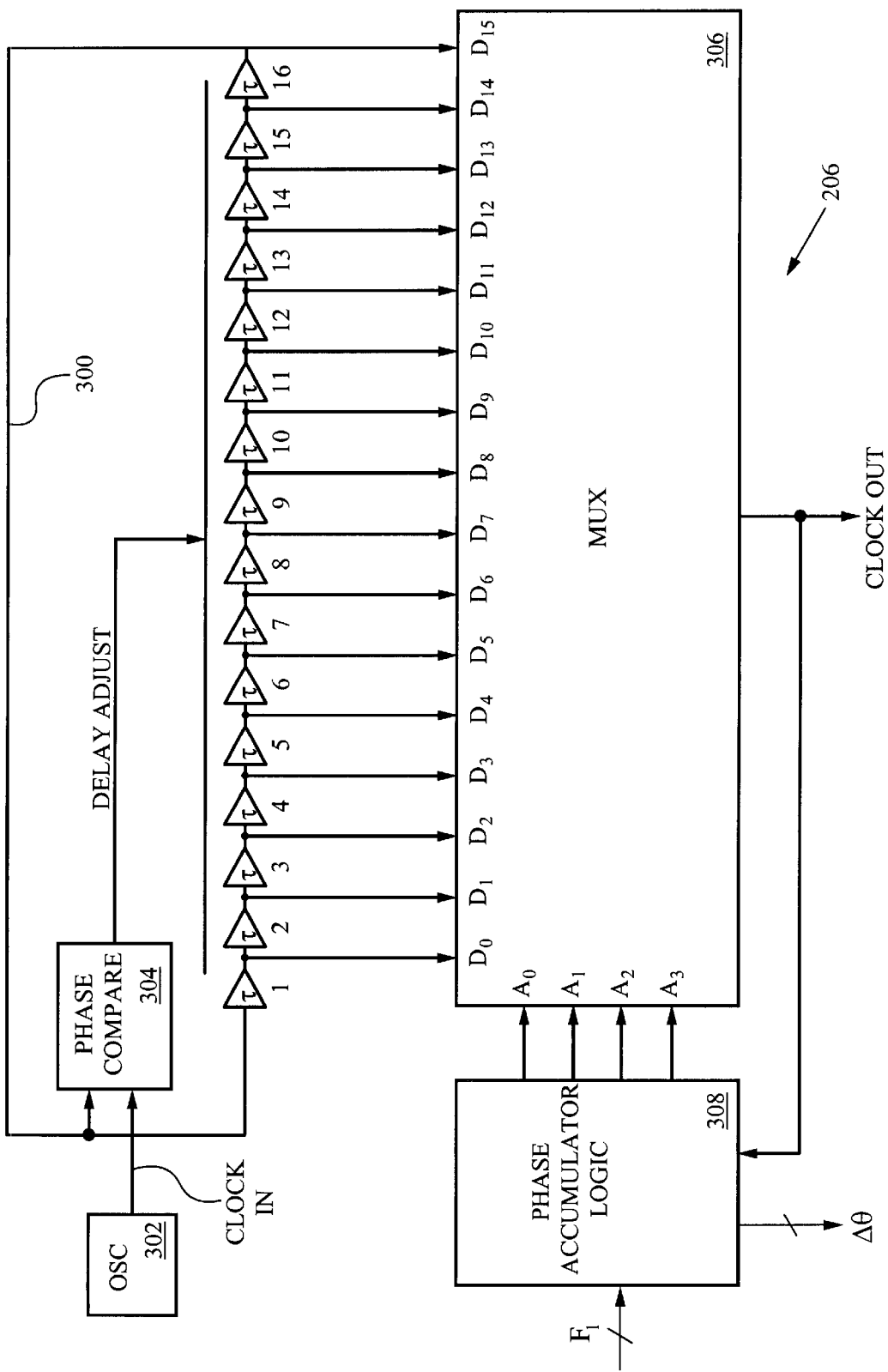
FIG. 3 illustrates a block schematic diagram of the clock generator circuit illustrated in FIG. 2.
Figure 4:
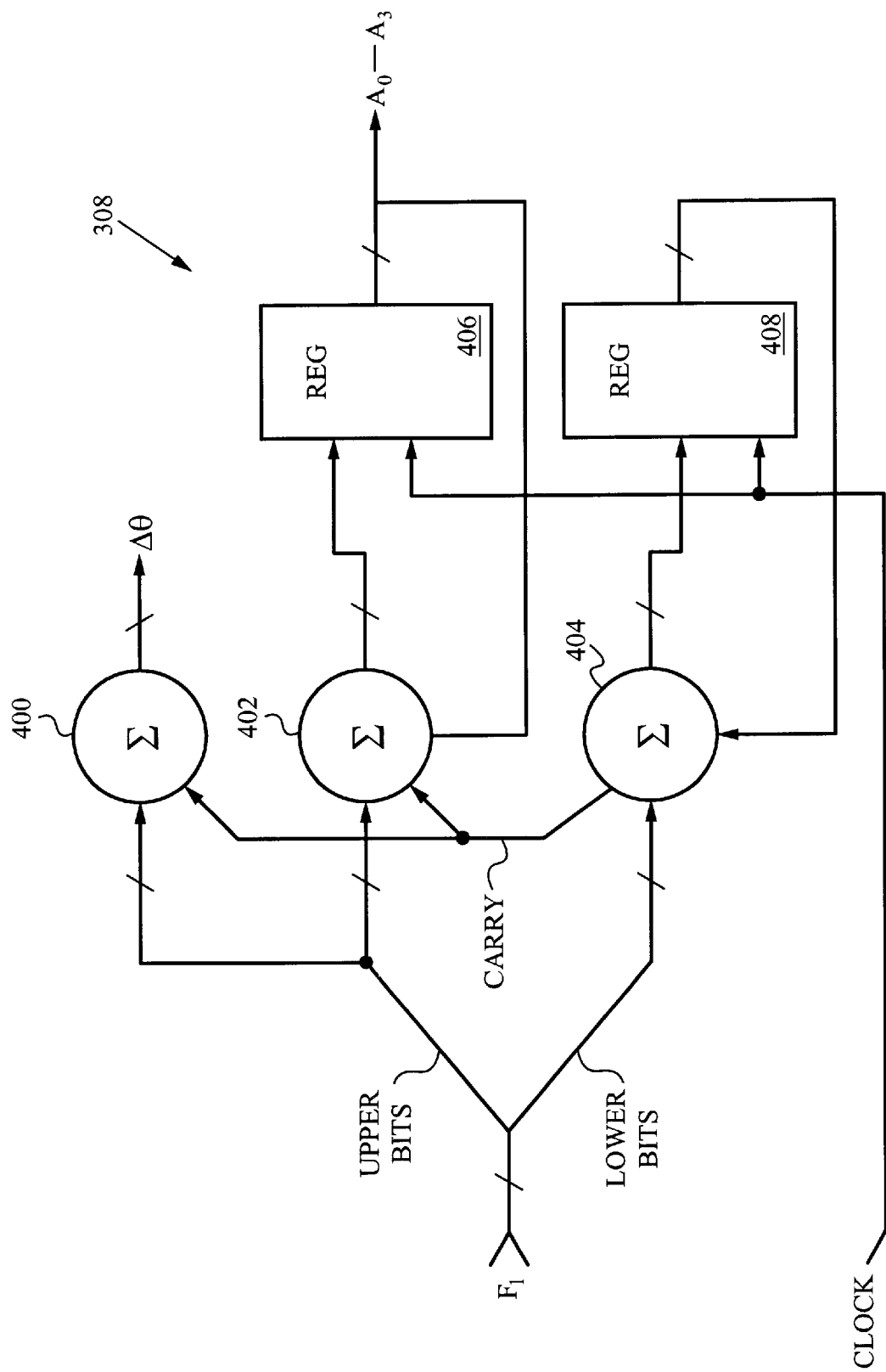
FIG. 4 illustrates a block schematic diagram of the phase accumulator logic circuit illustrated in FIG. 3.

A waveform generator block 216 receives the clock signal CLOCK OUT and a signal Δθ from the clock generator 206. The signal Δθ is a series of digital values formed by a phase accumulator logic circuit 308 (FIGS. 3 and 4). The signal OUTPUT WAVEFORM is a series of digital values which appear as though an ideal sinusoidal waveform was sampled according to the clock signal CLOCK OUT. This signal OUTPUT WAVEFORM can be utilized to demodulate a digital chrominance signal which has time base errors due to having circuit 112 illustrated in FIG. 1.

FIG. 3 illustrates a block schematic diagram of the clock generator circuit 206 illustrated in FIG. 2. A group of sixteen delay elements 1–16 form a ring oscillator 300. Thus, the delay elements 1–16 are series-coupled in a ring such that an output of the last delay element 16 is coupled to an input of the first delay element 1. Preferably, each of the delay elements 1–16 has an identical throughput delay, one to the other. According to the preferred embodiment, all the delay elements 1–16 are simultaneously manufactured in a single integrated circuit so that any manufacturing process induced variations in throughput delay will be identical in each of the delay elements 1–16. A clock signal CLOCK IN generated by an oscillator 302 is applied a first input of a phase comparator 304 while the output of the last delay element 16 is coupled to a second input of the phase comparator 304. An output DELAY ADJUST of the phase comparator 304 is coupled to adjust an amount of delay for each delay element 1–16. An output of each delay element 1–16 is coupled to a respective input $D_0$–$D_{15}$ of a multiplexor 306.

The oscillator 302 is preferably a crystal oscillator for ensuring accuracy and stability of the clock signal CLOCK IN and can include a divide-by circuit for reducing the frequency of the clock signal CLOCK IN from the crystal frequency. Therefore, the clock signal CLOCK IN has a precisely controlled frequency. The clock signal CLOCK IN is compared by the phase comparator 304 to the signal emerging from the last delay element 16. The phase comparator 304 simultaneously adjusts the delay of all the delay elements 1–16 such that the combined delay for all the delay elements 1–16 is equal to one cycle of the clock signal CLOCK IN. Therefore, each input $D_0$–$D_{15}$ of the multiplexor 306 has the same frequency as the clock signal CLOCK IN, but a unique phase. The last input $D_{15}$ has the same phase as the clock signal CLOCK IN.

Because there are sixteen delay elements sixteen different clock phase signals are available, however, a different number of delay elements can be utilized if desired. Further, if rising and trailing edges are both utilized, then thirty-two different clock phase signals are available. FIG. 3 illustrates a phase-locked loop for controlling the delay of the delay elements 1–16. It will be apparent that other means may be utilized for controlling the delay of the delay elements 1–16, such as a frequency locked loop or a delay locked loop. For example, a delay locked loop can be implemented by coupling the input of the first delay element 1 to the first input of the phase comparator 304 (along with the clock signal CLOCK IN) rather than coupling the input of the first delay element 1 to the second input of the phase comparator 304.

Four address input signals $A_0$–$A_3$ of the multiplexor 306 allow a clock phase signal from one of the delay elements 1–16 to be selected to appear at the output CLOCK OUT of the multiplexor 306. By selecting an appropriate one of the clock phase signals to appear at the output CLOCK OUT at a given moment, the phase and/or frequency of the CLOCK OUT signal can be very precisely controlled without disturbing the oscillator 302. Assuming 16 delay elements, the phase of each clock pulse of the signal CLOCK OUT is controllable in increments of 22.5 degrees. Assuming the oscillator 302 generates a clock signal CLOCK IN having a frequency of 54 Mhz, then each clock cycle is approximately 18.5 nanoseconds in duration and each delay element has a delay of approximately 1.2 nanoseconds. Therefore, the rising and falling edges of the CLOCK OUT signal are controllable in increments of approximately 0.6 nanoseconds. It will be apparent that a system having a different number of delay elements can be controllable in different increments of time and can require a different number of address input signals.

The frequency of the clock signal CLOCK IN generated by the oscillator 302 is preferably selected to be six percent lower that the average expected frequency of the signal CLOCK-OUT appearing at the output of the multiplexor 306. This provides a twelve percent range in frequency variation while avoiding the need to process negative numbers. It will be apparent that another frequency for the oscillator 302 and, thus, a percentage other than six percent, could be selected. In the alternative, the oscillator 302 could be conditioned to provide a signal having precisely the expected frequency, or higher than the expected frequency, and the system could correspondingly be configured to process negative numbers.

The phase accumulator logic circuit 308 is coupled to provide the input signals $A_0$–$A_3$ to the, multiplexor 306, based upon the signal $F_1$ and is described in more detail with reference to FIG. 4.

Figure 5:
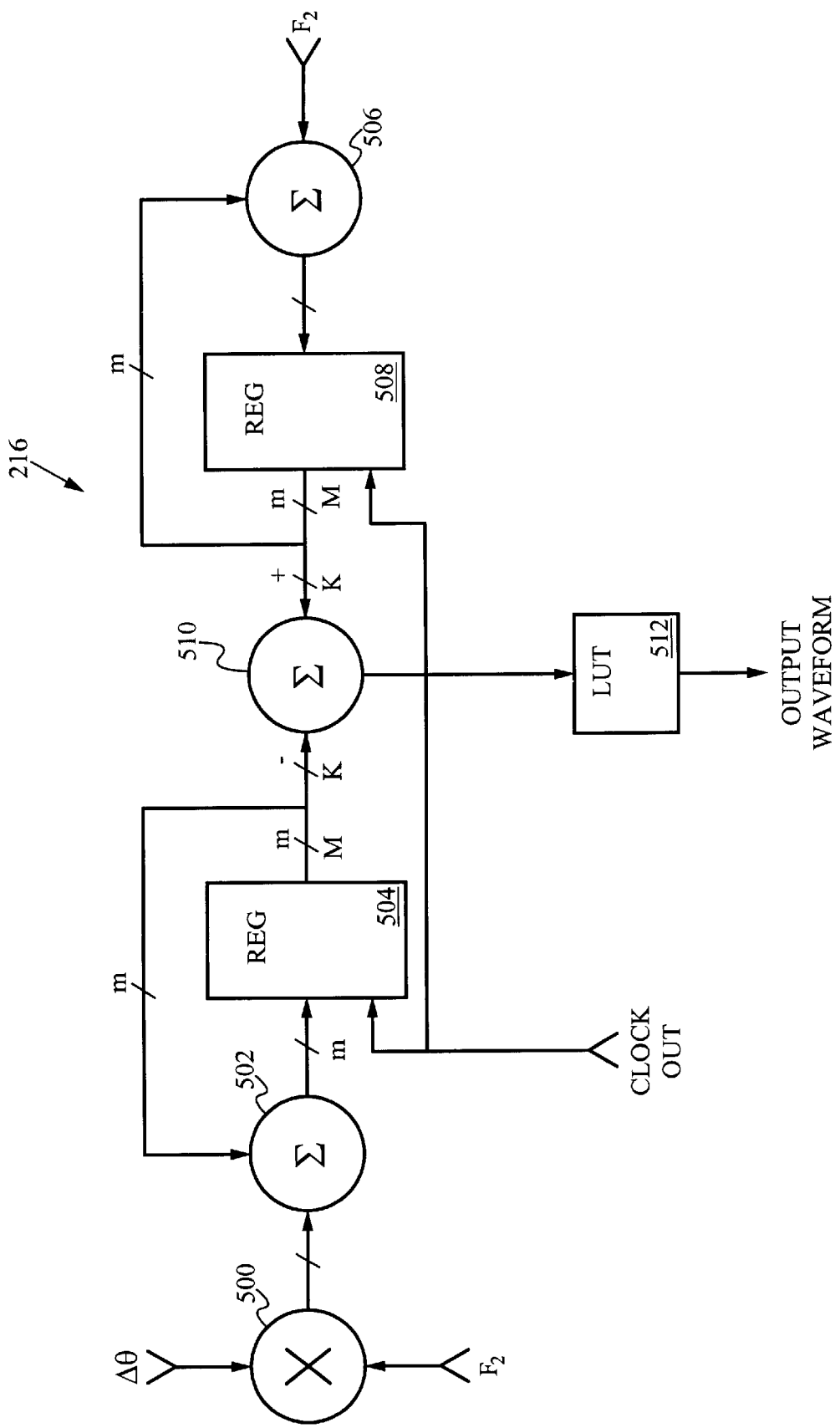
FIG. 5 illustrates a block schematic diagram of the waveform generator circuit illustrated in FIG. 2.

FIG. 4 illustrates a block schematic diagram of the phase accumulator logic circuit 308 illustrated in FIG. 3. The series of digital values $F_1$ are separated into upper and lower bits where the upper bits are the most significant bits and the lower bits are the least significant bits of each digital value in the series $F_1$. The upper bits are coupled to a first input of an adder 400 and to a first input of an adder 402. The lower bits are coupled to a first input of an adder 404. An output of the adder 400 forms a signal Δθ which is utilized by the waveform generator circuit 216 (FIGS. 2 and 5). An output of the adder 402 is coupled to an input of a register 406. An output of the adder 404 is applied to an input of a register 408. Contents of the register 406 are coupled to a second input of the adder 402 and are coupled to the address inputs $A_0$–$A_3$ of the multiplexor 306 illustrated in FIG. 3. Contents of the register 408 are coupled to a second input of the adder 404. A carry output of the adder 404 is coupled to a second input of the adder 400 and to a third input of the adder 402. Each of the registers 406 and 408 are clocked according the signal CLOCK OUT appearing at the output of the multiplexor 306 illustrated in FIG. 3.

The lower bits of the signal $F_1$ are summed by the adder 404 along with a previous sum obtained from the register 408. Overflow from the summing operation of the adder 404 is passed to the adder 402 and to the adder 400. The adder 402 sums the upper bits of the signal $F_1$, any carry bit from the adder 404, and the previous sum stored in the register 406. The adder 400 sums the upper bits of the signal $F_1$ and any carry bit from the adder 404.

The phase accumulator circuit 308 (FIGS. 3 and 4) has a function of generating a sequence of address bits $A_0$–$A_3$ for the multiplexor 306 (FIG. 3) by summing a previous value stored in the registers 406 and 408 and a value of the signal $F_1$ that is representative of a current phase error. Thus, the address bits $A_0$–$A_3$ are representative of a cumulation of the series of values $F_1$. Each sum appearing in the registers 406 and 408 is limited by a modulo function (typically $2^N$, where N=an integer corresponding to a total number of bits that the registers 406 and 408 are capable of storing). Therefore, the sequence of sums appearing in the registers 406 and 408 is representative of a sequence of phase samples of a phase wheel. The total number of bits in both the registers 406 and 408 determines the precision of frequency of rotation of the phase wheel.

Upper bits $A_0$–$A_3$ accumulated and stored in the register 406 are utilized to control the multiplexor 306 illustrated in FIG. 3. Therefore, the number of bits stored in the register 406 determines precision of the phase of the signal CLOCK OUT (FIG. 3) at any instant. The number of bits in the register 406 is the same as the number of address bits for the multiplexor 306. This number of bits depends upon the number of delay elements of the ring oscillator (comprising delay elements 1–16 and illustrated in FIG. 3). For example, in the preferred embodiment, because the ring oscillator has sixteen delay elements, there are four address bits stored by the register 406.

Lower bits stored in the register 408 are utilized to increase the precision of the accumulated sum of the upper bits at any instant by providing a carry bit the adder 402 each time the accumulated sum of the lower bits exceeds the greatest binary number capable of being expressed by the lower bits.

FIG. 5 illustrates a block schematic diagram of the waveform generator circuit 216 illustrated in FIG. 2 for generating a periodic waveform clocked according to the clock signal CLOCK OUT. A signal $F_2$ is a fixed value that is representative of an amount the phase of the clock signal CLOCK OUT will change when the address $A_0$–$A_3$ is incremented by one.

This fixed value $F_2$ is coupled to a first input of a multiplier 500. The signal $\Delta\theta$ is a series of digital values formed by the phase accumulator logic circuit 308 (FIGS. 3 and 4) and is representative of a number of input taps the multiplexor 306 will jump upon a next cycle of the clock signal CLOCK OUT. The signal $\Delta\theta$ is coupled to a second input of the multiplier 500. Therefore, the multiplier 500 generates a series of digital values wherein each value is representative of an amount of phase change for a next cycle of the clock signal CLOCK OUT.

Preferably, the number of taps of the multiplexor 306 that can be jumped in one clock cycle is limited to four. Therefore, assuming both the rising and trailing edges of the clock signal CLOCK OUT are considered, the multiplier 500 can be implemented by a multiplexor having four inputs having respective weights 0/32, 1/32, 3/32 and 4/32, where the weights are relative to a complete cycle (i.e., 360 degrees).

The output of the multiplier 500 is coupled to a first input of an adder 502. An output of the adder 502 is coupled to an input of a register 504. Contents of the register 504 are coupled to a second input of the adder 502. The register 504 is clocked by the clock signal CLOCK OUT. Therefore, the series of values generated by the multiplier 500 is accumulated over time in the register 504 at a rate determined by the clock signal CLOCK OUT. This generates a series of values in the register 504 representative of the total accumulated phase deviation of the clock signal CLOCK OUT relative to a complete cycle (i.e., 360 degrees). The register 504 stores a number of bits M (where M is an integer).

The signal $F_2$ is also applied to a first input to an adder 506. An output of the adder 506 is coupled to a register 508. The register 508 is also clocked by the clock signal CLOCK OUT. Contents of the register 508 are coupled to a second input of the adder 506. Therefore, the value of the signal $F_2$ is accumulated over time in the register 508 at the rate determined by the clock signal CLOCK OUT. This generates a series of values in the register 508 representative of a time base for the periodic signal relative to the clock signal CLOCK OUT. Therefore, the series of values stored in the register 508 is representative of a sawtooth waveform clocked by the clock signal CLOCK OUT such that the sawtooth waveform includes time base errors. The register 508 preferably stores a number of bits M.

The K (where K is an integer equal to or less than M) upper bits of the values stored in the register 504 are coupled to a first input of an adder 510. The K upper bits of the values stored in the register 508 are coupled to a second input of the adder 510. An output of the adder 510 is a difference between the K upper bits of the values stored in the registers 504 and 508 and is a time base stable series of values representative of phase angles of a complete cycle that track the clock signal CLOCK OUT. Therefore, this series of values appears substantially as though a perfect sawtooth waveform was sampled according to the clock signal CLOCK OUT. The number of bits M stored in the registers 504 and 508 determines the precision of the average frequency, while the number bits K utilized by the adder 510 determines the phase precision for each clock cycle.

The output of the adder 510 is coupled to a look-up table 512. The look-up table 512 includes digital memory for storing values of the periodic waveform corresponding at each phase represented by the binary number generated by the adder 510. Depending upon the values stored in the look-up table 512, the periodic waveform can be any waveform, but is preferably a sinusoid.

Therefore, the signal OUTPUT WAVEFORM appearing at the output of the look up table 512 is a series of digital values which appear as though an ideal sinusoidal waveform was sampled according to the clock signal CLOCK OUT. The phase and period of the signal OUTPUT WAVEFORM are independent of the clock signal CLOCK OUT and, thus, independent of the time base of the video signal from the video source 200, while the signal OUTPUT WAVEFORM is clocked according to the clock signal CLOCK OUT.

During playback through a video cassette player having signals stored according to the "color under" format, the luminance component signal includes sync pulses which can have time base variations. The luminance signal is applied to the video sync separator 202 (FIG. 2) and digital phase detector 204 (FIG. 2) for controlling the phase accumulator logic 308 (FIGS. 3 and 4). The phase accumulator logic 308 and the circuit illustrated in FIG. 5 generate a series of digital values OUTPUT WAVEFORM which represent a pure sinusoid without time base variations when clocked by the clock signal CLOCK OUT generated by the clock generator 206 (FIGS. 2 and 3). The pure sinusoid preferably has a frequency of 3.579545 MHz, corresponding to the subcarrier frequency for NTSC systems. The series of digital values OUTPUT WAVEFORM can then be utilized to demodulate a digital chrominance signal which has time base errors due to having been modulated down to a lower frequency for storage according to the "color under"format. For example, this signal OUTPUT WAVEFORM can be provided to the chroma demodulation circuit 112 illustrated in FIG. 1. Alternately, the series of digital values OUTPUT WAVEFORM can be converted to an analog sinusoid. The analog sinusoid can then be utilized by conventional circuits to demodulate an analog chrominance signal. By utilizing the pure sinusoid clocked according to the luminance signal sync pulses to demodulate the chrominance signal, the chrominance signal remains synchronized to the luminance signal and the picture quality is greatly enhanced over conventional demodulation methods.

Further, the clock signal CLOCK OUT appearing at the output of the multiplexor can be utilized to digitally process and/or store component signals, such as luminance and chrominance components, and can be utilized to digitally process and/or store audio signals, such as by decompressing compressed audio signals, while maintaining synchronism with associated signals.

Figure 6:
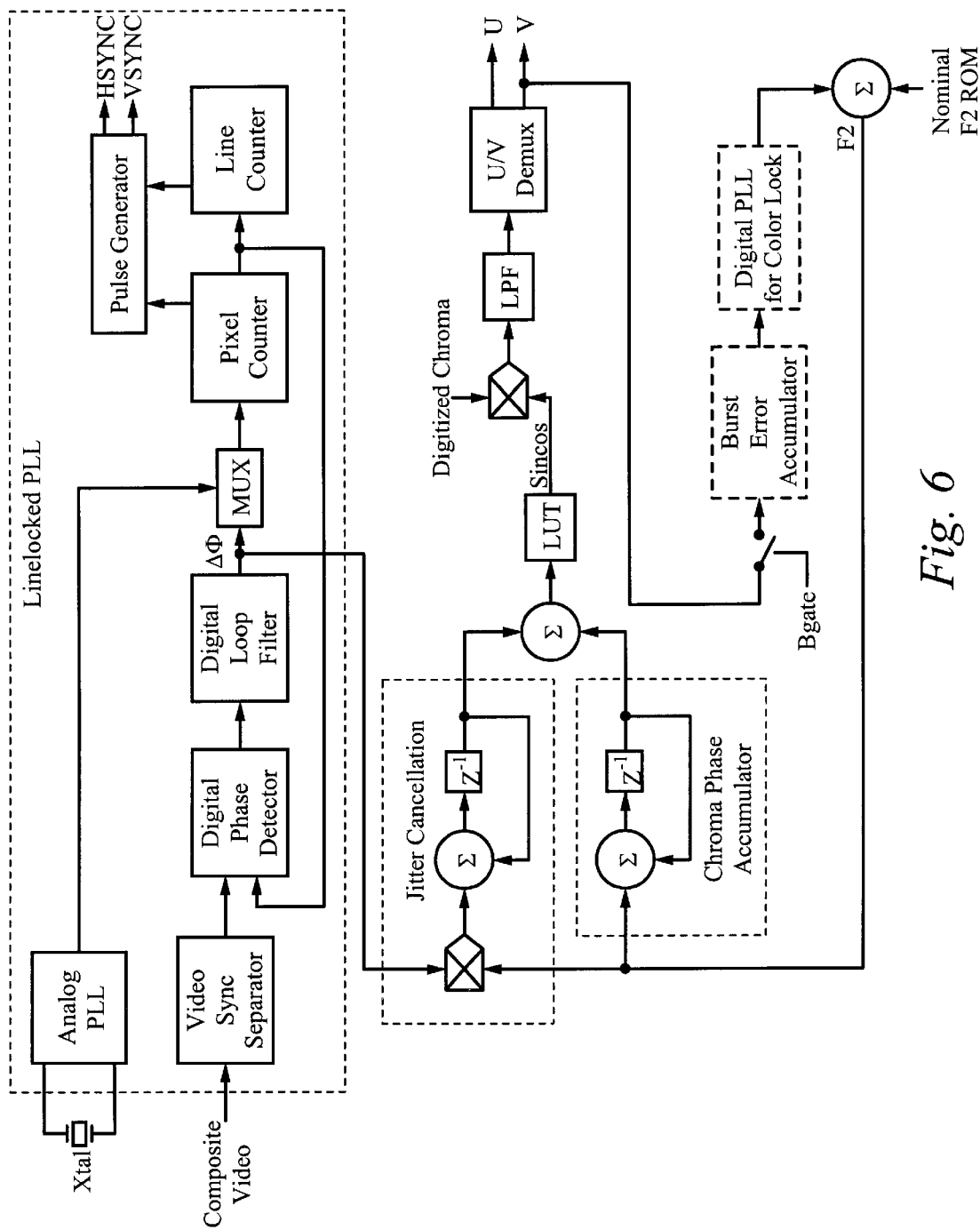
FIG. 6 illustrates a block schematic diagram of an integrated circuit chip incorporating the present invention.

Preferably, the circuits described herein are integrated into a circuit chip. Such an integrated circuit chip is anticipated to be available under part number ML6450, from Micro Linear Corporation, located at 2092 Concourse Drive, San Jose, Calif. FIG. 6 illustrates a block schematic diagram of the integrated circuit chip incorporating the present invention.

The present invention has been described in term s of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. For the purposes of this disclosure an "audio-visual signal" shall include any video signal, such as a composite video signal, such as NTSC or PAL composite video signals, a component video signal, such as luminance, chrominance, red, green, blue, and color difference signals and any audio signal, whether the signal is analog or digital or has been frequency or amplitude modulated by, superimposed on, added to, or subtracted from, another signal.

What is claimed is:

1. A method of correcting time base errors in an audio-visual signal comprising steps of:
   a. generating a plurality of clock signals, each clock signal having a same frequency and a relative phase;
   b. selecting appropriate ones of the plurality of clock signals in a sequence according to a series of time base errors wherein each time base error corresponds to a sequential portion of a first audio visual signal; and
   c. generating a series of values wherein each value in the series is representative of an amplitude of a periodic waveform coincident with a clock signal in the sequence of appropriate ones of the clock signals.

2. The method according to claim 1 further comprising a step of utilizing the series of values to demodulate a second audio-visual signal stored in a magnetic media.

3. The method according to claim 2 wherein the second audio-visual signal is a chrominance component signal.

4. An apparatus for correcting time base errors in an audio-visual signal, the apparatus comprising:
   a. a ring oscillator having a plurality of taps wherein each tap provides a periodic clock signal having a same frequency and a relative phase;
   b. a multiplexor having a plurality of data inputs, an address input and an output wherein each tap of the ring oscillator is coupled to one of the plurality of data inputs of the multiplexor;
   c. a circuit for providing an address to the address input of the multiplexor based upon a time base error corresponding to a portion of an audio-visual signal wherein the circuit for providing an address comprises:
      i. a circuit for forming a first digital value representative of a time difference between an expected occurrence of a sync pulse corresponding to the portion of the audio-visual signal and an actual occurrence of the sync pulse; and
      ii. a circuit for adding the first digital value to a sum of previous digital values for forming the address, the circuit for adding coupled to the circuit for forming; and
   d. a circuit for forming a second digital value representative of an amplitude of a periodic waveform sampled according to a clock signal appearing at the output of the multiplexor, wherein the circuit for forming the second digital value is coupled to receive the first digital value.

5. A method of correcting time base errors in an audio-visual signal comprising steps of:
   a. forming a plurality of periodic clock signals, each having a same frequency and a relative phase;
   b. providing the plurality of clock signals to a corresponding plurality of data inputs of a multiplexor;
   c. providing an address to an address input of the multiplexor based upon a time base error corresponding to a portion of a first audio-visual signal wherein the step of providing an address comprises steps of:
      i. forming a first digital value representative of a time difference between an expected occurrence of a sync pulse corresponding to the portion of the first audio-visual signal and an actual occurrence of the sync pulse; and
      ii. adding the first digital value to a sum of previous digital values for forming the address; and
   d. forming a second digital value representative of an amplitude of a periodic waveform sampled according to a clock signal appearing at an output of the multiplexor, wherein the circuit for forming the second digital value is coupled to receive the first digital value.

6. The method according to claim 5 further comprising a step of utilizing the second digital value to demodulate a second audio-visual signal stored in a magnetic media.

7. An apparatus for correcting time base errors in an audio-visual signal, the apparatus comprising:
   a. a ring oscillator having a plurality of taps wherein each tap provides a periodic clock signal having a same frequency and a relative phase;
   b. a multiplexor having a plurality of data inputs, an address input and an output wherein each tap of the ring oscillator is coupled to one of the plurality of data inputs of the multiplexor;
   c. a circuit for providing a series of addresses to the address input of the multiplexor based upon a clock phase desired to appear at the output of the multiplexor;
   d. a circuit for providing a first series of digital values to the circuit for providing the series of addresses wherein each value in the first series is representative of a time base error corresponding to a portion of the audio-visual signal; and
   e. a circuit for providing a second series of digital values representative of a periodic waveform sampled according to the clock phase appearing at the output of the multiplexor wherein the circuit for providing the second series of digital values is coupled to receive the first series of digital values.

8. The apparatus according to claim 7 wherein the circuit for providing the first series of digital values comprises:

a. a circuit for separating a sync pulse from the portion of the audio-visual signal; and b. a circuit for measuring a time difference between an expected occurrence of the sync pulse and an actual occurrence of the sync pulse, wherein the circuit for measuring the time difference is coupled to the circuit for separating and wherein the time difference is representative of a time base error corresponding to the portion of the audio-visual signal.

9. The apparatus according to claim 7 wherein the circuit for providing the series of addresses accumulates values in the first series of digital values over time for generating the series of addresses.

10. The apparatus according to claim 7 wherein the circuit for providing the series of addresses comprises:

a. a first adder having a first input, a second input and an output wherein the first input of the first adder is coupled to receive the first series of digital values; and b. a first storage register having an input and output wherein the input of the storage register is coupled to the output of the first adder and wherein the output of the first storage register is coupled to the second input of the first adder.

11. The apparatus according to claim 10 wherein the first adder receives only upper bits of the first series of digital values and further comprises a third input and wherein the circuit for providing a series of addresses further comprises:

a. a second adder having a first input, a second input, a summing output and a carry output wherein the first input of the second adder receives lower bits of the first series of digital values and the carry output is coupled to the third input of the first adder; and b. a second storage register having an input and an output wherein the input of the second storage register is coupled to the summing output of the second adder and wherein the output of the storage register is coupled to the second input of the second adder.

12. The apparatus according to claim 11 further comprising:

a. a third adder having a first input, a second input and an output wherein the first input is coupled to receive the upper bits of the first series of digital values, the second input is coupled to the carry output of the second adder;

b. a multiplier having a first input, a second input and an output wherein a first input of the multiplier is coupled to the output of the third adder and the second input of the multiplier is coupled to receive a value corresponding to a phase difference between adjacent taps of the multiplexor;

c. a fourth adder having a first input and a second input wherein the first input of the fourth adder is coupled to the output of the multiplier;

d. a third storage register having an input and an output wherein the input of the third storage register is coupled to the output of the fourth adder and the output of the third storage register is coupled to the second input of the fourth adder.

13. The apparatus according to claim 12 further comprising:

a. a fifth adder having a first input and second input wherein the first input is coupled to receive the value corresponding to a phase difference between adjacent taps of the multiplexor; and b. a fourth storage register having an input and an output wherein the input of the fourth storage register is coupled to the output of the fifth adder and the output of the fourth storage register is coupled to the second input of the fifth adder.

14. The apparatus according to claim 13 further comprising:

a. a sixth adder having a first input, a second input and an output wherein the first input is coupled to the output of the fourth adder and the second input is coupled to the output of the fifth adder; and b. a memory device including a look-up table coupled to the output of the sixth adder.

15. A method of correcting time base errors in an audio-visual signal comprising steps of:

a. forming a clock signal wherein a phase of the clock signal is controlled according to a phase of a audio-visual signal having a varying time base;

b. forming a first series of digital values, each of which represents a time base or phase error associated with a portion of the audio-visual signal;

c. cumulating the first series of digital values for forming a first series of cumulated values wherein each of first series of cumulated values is representative of a phase change between successive cycles of the clock signal;

d. cumulating the first series of cumulated values for forming a second series of cumulated values wherein each of the second series of cumulated values is representative of an accumulated phase of the clock signal;

e. cumulating a fixed value thereby forming a series of values representative of a sawtooth waveform clocked according to the clock signal; and f. subtracting the each of the second series of cumulated values from each of the series of values representative of a sawtooth waveform thereby forming a series of difference values.

16. The method according to claim 15 further comprising a step of applying the series of difference values to a look-up table thereby forming a second series of digital values representative of a sinusoidal waveform sampled according to the clock signal.

* * * * *